Sept. 6, 1938.                      R. POHL                    2,129,535
               LAMINATED CORE FOR ELECTRICAL APPARATUS
                        Filed Feb. 3, 1937
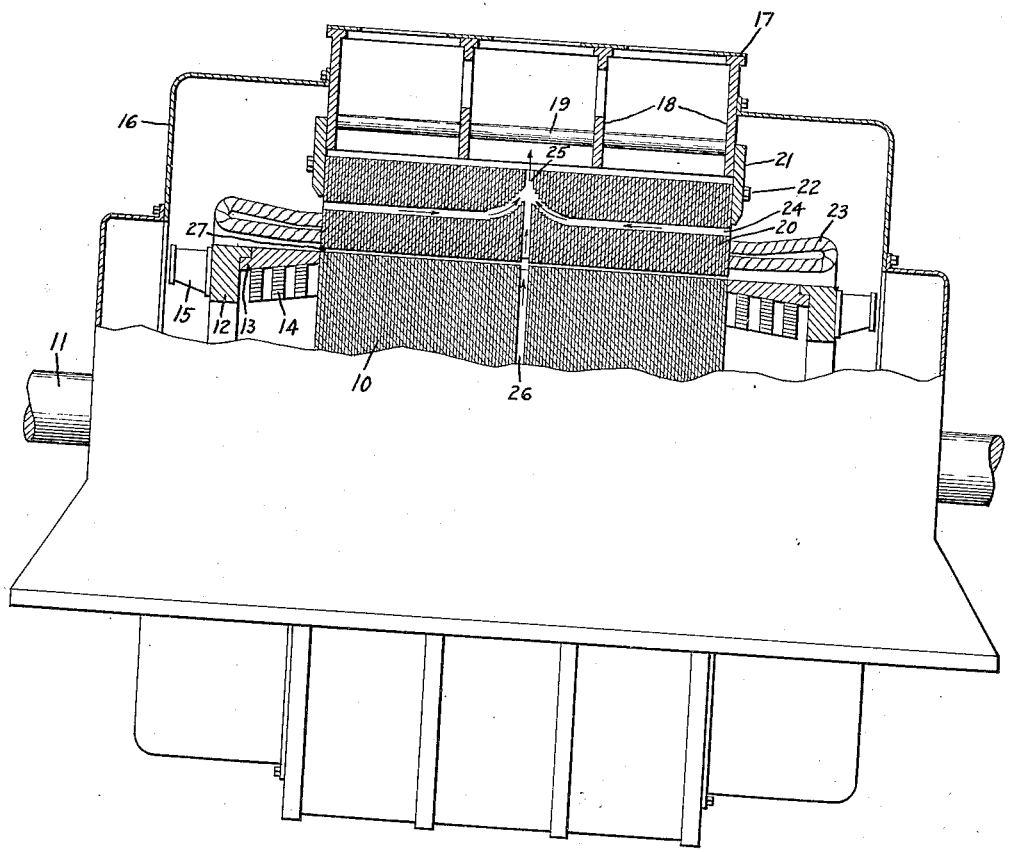
Inventor:
Robert Pohl,
by Harry E. Dunham
His Attorney.

Patented Sept. 6, 1938

2,129,535

UNITED STATES PATENT OFFICE 2,129,535

LAMINATED CORE FOR ELECTRICAL APPARATUS

Robert Pohl, Berlin, Germany, assignor to General Electric Company, a corporation of New York Application February 3, 1937, Serial No. 123,791
In Germany July 17, 1936

2 Claims. (Cl. 171—252)

My invention relates to improvements in laminated cores for electrical apparatus, and particularly to ventilated laminated core structures for dynamo-electric machines.

An object of my invention is to provide an improved and simplified ventilated laminated core structure for electrical apparatus.

Further objects and advantages of my invention will become apparent from the folowing description referring to the accompanying drawing, and the features of novelty which characterize my invention will be pointed out with particularity in the claims annexed to and forming a part of this specification.

For a better understanding of my invention, reference is made to the accompanying drawing, wherein the single figure is a side elevational view in partial section of a dynamo-electric machine embodying my invention.

Referring to the drawing, I have shown a dynamo-electric machine provided with a rotatable member having a laminated core 10 supported on the shaft 11. The laminations of the core 10 are held in assembled relation by clamping rings 12 and 13 which support the end turns of an electrical winding 14. Each end of the rotatable member is provided with a fan 15, which is arranged to circulate a cooling medium, such as air, through the dynamo-electric machine.

A stationary member for the dynamo-electric machine also is provided, having end shields 16 enclosing ends of the rotatable member and forming an air deflecting compartment about the stationary member so as to direct the cooling air through the machine. The end shields 16 are secured to a frame 17, which is provided with a plurality of circumferentially extending plates 18 connected together by cross ties 19 welded to the plates 18. The stationary member of the dynamo-electric machine is provided with a core formed by an assembly of laminations 20 secured together by clamping covers 21 and bolts 22 extending through the laminations. An electrical winding 23 is arranged in slots formed in the laminated core of the stationary member to co-operate electro-dynamically with the rotatable member 10.

In electrical apparatus, it has been found desirable to cool the core of the apparatus, as the heating of a machine generally is the limiting factor in determining its capacity. In order to properly cool dynamo-electric machines, various arrangements of passages formed in the core of the apparatus for conducting a cooling medium therethrough have been devised. It has been found that when transversely extending radial air passages are formed in a core, and communicate with longitudinally extending axial passages, the cooling medium, such as air, produces eddy currents and restriction at the place where the two passages meet, thus reducing the effectiveness of the ventilating arrangement. In order to avoid this condition, I provide longitudinally extending axial passages 24 formed by a plurality of holes in the laminations of the core arranged in registering relation, and provide a series of transverse radially extending passages 25 which communicate with the passages 24 intermediate the ends thereof. The openings in the laminations are arranged in stepped relation adjacent each side of the communication of the longitudinally extending passages 24 and the transverse passages 25, and these openings, which are arranged in stepped relation, are formed of increasingly larger size and arranged in increasingly larger steps from the longitudinally extending passage towards the transverse passage, thereby forming outwardly extending curved portions flared toward the point of communication between the longitudinally extending and transverse passages. The rotatable member also is provided with a radially extending ventilating passage 26, and when the dynamo-electric machine operates, the fans 15 blow air, as indicated by the arrows on the drawing, through the ventilating passages 24, 25, and 26, and the air gap 27 between the rotatable and stationary members of the dynamo-electric machine. In this manner, the air passing from the axial passages 24 into the radial passages 25 tends to flow in a radial direction into the ventilating passage 25 smoothly and without interference with the radially flowing air entering this passage from the rotatable member or from the air gap. This direction of flow of air from the two sides of the longitudinally extending passages also minimizes turbulence due to opposing air currents entering the radial passage from the two longitudinally extending passages on each side of the radial passage. By varying the progressive stepped relation of the registering openings in the laminations which form the curved portion of the longitudinal passages, and by varying the size of these openings, any desired curvature and flaring of the air passage can be obtained. This arrangement may be utilized in the assembly of laminations forming the core of the rotatable member, as well as in the stationary member.

While I have illustrated and described a particular embodiment and application of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A dynamo-electric machine having a core formed of an assembly of laminations, means including openings formed in said laminations arranged in registering relation to provide a longitudinally extending passage through said core for conducting a cooling medium therethrough, a transverse passage communicating with said longitudinally extending passage, said openings in said laminations being arranged in stepped relation adjacent the junction of said transverse passage and said longitudinally extending passage forming an outwardly curved portion to provide for smooth flow of cooling medium from said longitudinally extending passage into said transverse passage, and said openings arranged in stepped relation being of increasingly larger sizes and arranged in increasingly larger steps toward the junction of said longitudinally extending passage and said transverse passage.

2. A dynamo-electric machine having a core formed of an assembly of laminations, means including openings formed in said laminations arranged in registering relation to provide longitudinally extending passages through said core for conducting cooling medium therethrough, transverse passages formed in said core communicating with said longitudinally extending passages intermediate the ends of said transverse passages, said openings in said laminations being arranged in stepped relation adjacent each side of the junction of said transverse passages and said longitudinally extending passages forming outwardly curved portions to provide for smooth flow of cooling medium from said longitudinally extending passages into said transverse passages, said openings arranged in stepped relation being of increasingly larger sizes on each side towards the junction of said longitudinally extending passages and said transverse passages and arranged in increasingly larger steps toward the junction of said longitudinally extending passages and said transverse passages.

ROBERT POHL.